(12) United States Patent
Qiao et al.

(10) Patent No.: US 11,997,725 B2
(45) Date of Patent: May 28, 2024

(54) SATELLITE COMMUNICATION METHOD, APPARATUS, AND SYSTEM

(71) Applicant: Huawei Technologies Co., Ltd., Shenzhen (CN)

(72) Inventors: Yunfei Qiao, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 536 days.

(21) Appl. No.: 17/317,298

(22) Filed: May 11, 2021

(65) Prior Publication Data
US 2021/0410198 A1 Dec. 30, 2021

Related U.S. Application Data

(63) Continuation of application No. PCT/CN2019/117430, filed on Nov. 12, 2019.

(30) Foreign Application Priority Data

Nov. 12, 2018 (CN) .......................... 201811341283.0

(51) Int. Cl.
H04W 74/08 (2009.01)
H04W 72/1263 (2023.01)
(Continued)

(52) U.S. Cl.
CPC ... *H04W 74/0841* (2013.01); *H04W 72/1263* (2013.01); *H04W 74/004* (2013.01); *H04W 84/06* (2013.01)

(58) Field of Classification Search
None
See application file for complete search history.

(56) References Cited

U.S. PATENT DOCUMENTS 9,341,719 B2 * 5/2016 Jarvis ...................... G01S 19/24
9,749,035 B2 * 8/2017 Vasavada ............... H04B 7/195
(Continued)

FOREIGN PATENT DOCUMENTS

CN 1155192 A 7/1997
CN 108702200 A 10/2018
(Continued)

OTHER PUBLICATIONS

Thales, IDC, "NR-NTN: solution principles for NR to support non-terrestrial networks", 3GPP TSG RAN1 Meeting #93, R1-1807864, Busan, Korea, May 21-25, 2018, 12 pages.
(Continued)

*Primary Examiner* — Faiyazkhan Ghafoerkhan
(74) *Attorney, Agent, or Firm* — Slater Matsil, LLP

(57) ABSTRACT

This application provides a satellite communication device and method, the method including obtaining ephemeris information of a satellite in a satellite network, the ephemeris information of the satellite in the satellite network including one or more a beam parameter of the satellite in the satellite network, a physical resource of the satellite in the satellite network, or scheduling information of the satellite in the satellite network, generating a first message based on the ephemeris information of the satellite in the satellite network, where the first message includes ephemeris information of one or more satellites that serve a terminal device, and sending the first message when the terminal device performs random access, to implement communication between the terminal device and the one or more satellites.

20 Claims, 12 Drawing Sheets

(51) Int. Cl.
*H04W 74/00* (2009.01)
*H04W 74/0833* (2024.01)
*H04W 84/06* (2009.01)

(56) References Cited

U.S. PATENT DOCUMENTS

| | | | |
|---|---|---|---|
| 9,888,426 B2* | 2/2018 | Ulupinar | H04B 7/2041 |
| 9,973,264 B2* | 5/2018 | Vasavada | H04W 56/00 |
| 11,411,675 B2* | 8/2022 | Liu | H04W 24/08 |
| 11,528,644 B2* | 12/2022 | Cheng | H04W 36/0072 |
| 2016/0323800 A1* | 11/2016 | Ulupinar | H04B 7/2041 |
| 2018/0013484 A1* | 1/2018 | Vasavada | H04W 56/00 |
| 2018/0292538 A1* | 10/2018 | Raghupathy | G01S 19/45 |
| 2020/0358553 A1* | 11/2020 | Liu | H04L 1/0061 |
| 2021/0306942 A1* | 9/2021 | Wigard | H04W 48/12 |
| 2021/0376919 A1* | 12/2021 | Lin | H04W 28/02 |
| 2021/0410198 A1* | 12/2021 | Qiao | H04W 74/0841 |

FOREIGN PATENT DOCUMENTS

| | | | |
|---|---|---|---|
| RU | 2192095 C2 | 10/2002 | |
| WO | 2017142584 A1 | 8/2017 | |

OTHER PUBLICATIONS

Ericsson, "On adapting random access procedures for NTN", 3GPP TSG-RAN WG1 Meeting #95, R1-1813367, Spokane, WA, US, Nov. 12-16, 2018, 3 pages.

* cited by examiner

SATELLITE COMMUNICATION METHOD, APPARATUS, AND SYSTEM

CROSS-REFERENCE TO RELATED APPLICATIONS

This application is a continuation of International Application No. PCT/CN2019/117430, filed on Nov. 12, 2019, which claims priority to Chinese Patent Application No. 201811341283.0, filed on Nov. 12, 2018. The disclosures of the aforementioned applications are hereby incorporated by reference in their entireties.

TECHNICAL FIELD

This application relates to the field of satellite communication, and in particular, to a satellite communication method, apparatus, and system.

BACKGROUND

With the development of communications technologies, people have higher requirements on indicators such as high efficiency, mobility, and diversity of the communications technologies. Currently, an important development direction in the communications field is global mobile communication, and satellite communication is an important part of global mobile communication. The satellite communication features a long communication distance, a large coverage area, and flexible networking. In some important fields, such as space communication, aviation communication, maritime communication, and military communication, satellite communication plays an irreplaceable role. The satellite communication may provide services for both fixed terminal devices and various mobile terminal devices. A satellite communication system can be classified into a geostationary earth orbit (GEO) satellite system and a non-geostationary earth orbit (NGEO) satellite system based on an altitude of an orbit where a satellite providing services is located, and the non-geostationary earth orbit satellite system may be further classified into a medium earth orbit (MEO) satellite system and a low earth orbit (LEO) satellite system. The low earth orbit satellite system has become a hot development issue of global mobile communication because of its low orbit height and short propagation delay.

The characteristic of high-speed movement of a satellite determines that a network topology of the satellite constantly changes. For example, the orbit height of a low earth orbit satellite system is about 500 km to 1000 km. A single satellite covers a relatively small ground coverage area and moves at a high speed of 25000 km/h relative to the ground. An average time in which the satellite covers a terminal device is only several minutes. Therefore, a cell covered by the satellite also changes with the high-speed movement of the satellite. For example, for a low earth orbit satellite system with an orbit height of 1000 km and a minimum elevation angle of 10 degrees, an average time in which a satellite covers a terminal device is only about 6 minutes.

A future mobile communications network is mainly classified into three access scenarios. (1) Cellular coverage: In a densely populated environment, cellular networks are densely deployed and provide strong signal coverage. In this case, users choose to access cellular networks to implement mobile communication. (2) Satellite coverage: In areas such as oceans and deserts that are not frequently visited, there is no cellular network coverage due to difficulty in construction and high costs. In this case, users choose to access satellite networks to implement mobile communication. (3) Hybrid access: In scenarios such as rural areas, suburban areas, and sea-land boundary areas, signals in cellular networks are weak. In this case, users can select a dual-connectivity mode of access to cellular networks and satellite networks to improve communication reliability.

In the foregoing dual-connectivity scenario of hybrid access to the cellular networks and the satellite networks, that is, in a scenario in which a mobile communications network includes a terminal device, a base station, and a satellite, because the satellite moves at a high speed, a topology of a satellite network that provides a service for the terminal device changes frequently, and the terminal device cannot accurately access a satellite that provides a service for the terminal device. Consequently, communication is interrupted.

SUMMARY

This application provides a satellite communication method, apparatus, and system, to quickly and accurately learn of ephemeris information of a satellite that provides a service for a terminal device, thereby implementing dual connectivity of the terminal device to a cellular network and a satellite network, and ensuring accuracy and stability of a dual-connectivity access mode.

According to a first aspect, a satellite communication method is provided, and includes an ephemeris management unit obtains ephemeris information of a satellite in a satellite network, where the ephemeris information of the satellite in the satellite network includes one or more of the following information, including a beam parameter of the satellite in the satellite network, a physical resource of the satellite in the satellite network, and scheduling information of the satellite in the satellite network. The ephemeris management unit generates a first message based on the ephemeris information of the satellite in the satellite network, where the first message includes ephemeris information of one or more satellites that serve a terminal device. When the terminal device performs random access, the ephemeris management unit sends the first message, to implement communication between the terminal device and the satellite.

With reference to the first aspect, in some implementations of the first aspect, obtaining ephemeris information of the satellite in the satellite network specifically includes obtaining the ephemeris information of the satellite in the satellite network through a first interface, where the first interface includes an NG-S interface or an X-S interface.

With reference to the first aspect, in some implementations of the first aspect, sending the first message when the terminal device performs random access specifically includes when the terminal device performs random access, sending the first message through a second interface, where the second interface includes an NG-C interface, an X-C interface, or an NG-X interface.

With reference to the first aspect, in some implementations of the first aspect, the satellite communication method further includes obtaining an ephemeris request message of the terminal device, where the ephemeris request message is used to request the ephemeris information of the one or more satellites that serve the terminal device.

According to a second aspect, a satellite communication method is provided. The method includes When a terminal device performs random access, the terminal device sends an ephemeris request message, where the ephemeris request message is used to request ephemeris information of one or more satellites that serve the terminal device, and the ephemeris information includes one or more of the following information, including a beam parameter of the satellite that serves the terminal device, a physical resource of the satellite that serves the terminal device, and scheduling information of the satellite that serves the terminal device. The terminal device obtains a first message, where the first message includes the ephemeris information of the one or more satellites that serve the terminal device. The terminal device obtains, based on the first message, ephemeris information of the satellite that communicates with the terminal device. The terminal device establishes a communication connection between the terminal device and the satellite based on the obtained ephemeris information of the satellite that communicates with the terminal device. The terminal device communicates with the satellite by using the established communication connection.

With reference to the second aspect, in some implementations of the second aspect, that the terminal device obtains a first message specifically includes the terminal device obtains the first message through an NG-C interface, an X-C interface, or an NG-X interface.

With reference to the second aspect, in some implementations of the second aspect, that the terminal device obtains, based on the first message, ephemeris information of the satellite that communicates with the terminal device specifically includes the terminal device selects, based on the first message, the satellite that communicates with the terminal device, and the terminal device obtains the ephemeris information of the selected satellite based on the selected satellite.

With reference to the second aspect, in all implementations of the second aspect, the request message is a random access message or uplink control information (UCI).

According to a third aspect, a communications apparatus is provided. The communications apparatus includes an obtaining unit, configured to obtain ephemeris information of a satellite in a satellite network, where the ephemeris information of the satellite in the satellite network includes one or more of the following information, including a beam parameter of the satellite in the satellite network, a physical resource of the satellite in the satellite network, and scheduling information of the satellite in the satellite network, a processing unit, configured to generate a first message based on the ephemeris information of the satellite in the satellite network, where the first message includes ephemeris information of one or more satellites that serve a terminal device, and a sending unit, configured to send the first message when the terminal device performs random access. With reference to the third aspect, in some implementations of the third aspect, the obtaining unit is specifically configured to obtain the ephemeris information of the satellite in the satellite network through a first interface, where the first interface includes an NG-S interface or an X-S interface.

With reference to the third aspect, in some implementations of the third aspect, the sending unit is specifically configured to when the terminal device performs random access, send the first message through a second interface, where the second interface includes an NG-C interface, an X-C interface, or an NG-X interface.

With reference to the third aspect, in some implementations of the third aspect, the obtaining unit is further configured to obtain an ephemeris request message of the terminal device, where the ephemeris request message is used to request the ephemeris information of the one or more satellites that serve the terminal device.

According to a fourth aspect, a communications apparatus is provided. The communications apparatus includes a memory, configured to store a program, and a processor, configured to execute the program stored in the memory. When the program is executed, the processor is configured to perform the satellite communication method according to any one of the first aspect and the possible implementations of the first aspect.

According to a fifth aspect, a computer-readable storage medium is provided. The computer-readable storage medium stores instructions, and when the instructions are run on a computer, the computer is enabled to perform the satellite communication method according to any one of the first aspect and the possible implementations of the first aspect.

According to a sixth aspect, a computer program product including instructions is provided. When the computer program product runs on a computer, the computer is enabled to perform the satellite communication method according to any one of the first aspect and the possible implementations of the first aspect.

According to a seventh aspect, a chip is provided, including a memory and a processor. The memory is configured to store a computer program, and the processor is configured to invoke the computer program from the memory and run the computer program, so that the processor performs the satellite communication method according to any one of the first aspect and the possible implementations of the first aspect.

According to an eighth aspect, a terminal device is provided. The terminal device includes a transceiver unit, configured to when the terminal device performs random access, send an ephemeris request message, where the ephemeris request message is used to request ephemeris information of one or more satellites that serve the terminal device, and the ephemeris information includes one or more of the following information, including a beam parameter of the satellite that serves the terminal device, a physical resource of the satellite that serves the terminal device, and scheduling information of the satellite that serves the terminal device, obtain a first message, where the first message includes the ephemeris information of the one or more satellites that serve the terminal device, and send data by using a communication connection established between the terminal device and the satellite, and a processing unit, configured to obtain, based on the first message, ephemeris information of the satellite that communicates with the terminal device, and establish the communication connection between the terminal device and the satellite based on the obtained ephemeris information of the satellite that communicates with the terminal device.

With reference to the eighth aspect, in some implementations of the eighth aspect, the transceiver unit is specifically configured to obtain the first message through an NG-C interface, an X-C interface, or an NG-X interface.

With reference to the eighth aspect, in some implementations of the eighth aspect, the processing unit is specifically configured to select, based on the first message, the satellite that communicates with the terminal device, and obtain the ephemeris information of the selected satellite based on the selected satellite.

According to a ninth aspect, a terminal device is provided. The terminal device includes a memory, configured to store a program, and a processor, configured to execute the program stored in the memory. When the program is executed, the processor is configured to perform the satellite communication method according to any one of the second aspect and the possible implementations of the second aspect.

According to a tenth aspect, a computer-readable storage medium is provided. The computer-readable storage medium stores instructions, and when the instructions are run on a computer, the computer is enabled to perform the satellite communication method according to any one of the second aspect and the possible implementations of the second aspect.

According to an eleventh aspect, a computer program product including instructions is provided. When the computer program product runs on a computer, the computer is enabled to perform the satellite communication method according to any one of the second aspect and the possible implementations of the second aspect.

According to a twelfth aspect, a chip is provided, including a memory and a processor. The memory is configured to store a computer program, and the processor is configured to invoke the computer program from the memory and run the computer program, so that the processor performs the satellite communication method according to any one of the second aspect and the possible implementations of the second aspect.

According to a thirteenth aspect, a communications system is provided. The communications system includes an ephemeris management unit, a satellite network, and a cellular mobile network. The satellite network includes one or more satellites, the cellular mobile network includes a base station and a terminal device connected to the base station, and the ephemeris management unit includes the communications apparatus according to any one of the possible implementations of the third aspect and the fourth aspect and the terminal device according to any one of the possible implementations of the eighth aspect and the ninth aspect.

With reference to the thirteenth aspect, in some implementations of the thirteenth aspect, a satellite ground management unit is configured to obtain ephemeris information of the satellite in the satellite network through an NG-C interface, an X-C interface, or an NG-X interface, and send the ephemeris information of the satellite in the satellite network to the ephemeris management unit through an X-S interface.

With reference to the thirteenth aspect, in some implementations of the thirteenth aspect, a mobility management unit is configured to receive ephemeris information that is of the satellite in the satellite network and that is obtained by the ephemeris management unit through an X-C interface, and send a first message to the base station in the cellular network through an NG-C interface, an X-C interface, or an NG-X interface, and forward the first message to the terminal device via the base station.

DETAILED DESCRIPTION OF ILLUSTRATIVE EMBODIMENTS

The following describes the technical solutions of this application in detail with reference to the accompanying drawings.

A cellular network communications system mentioned in the embodiments of this application includes but is not limited to a long term evolution (long term evolution, LTE) system and a 5G new radio (new radio, NR) system, or a post-5G new mobile communications system.

A terminal device in this application may be user equipment (UE), a terminal, an access terminal, a subscriber unit, a subscriber station, a mobile station, a mobile console, a remote station, a remote terminal, a mobile device, a user terminal, a wireless communications device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a 5G network, a terminal device in a future evolved public land mobile network (PLMN), or the like. This is not limited in the embodiments of this application.

Figure 1:
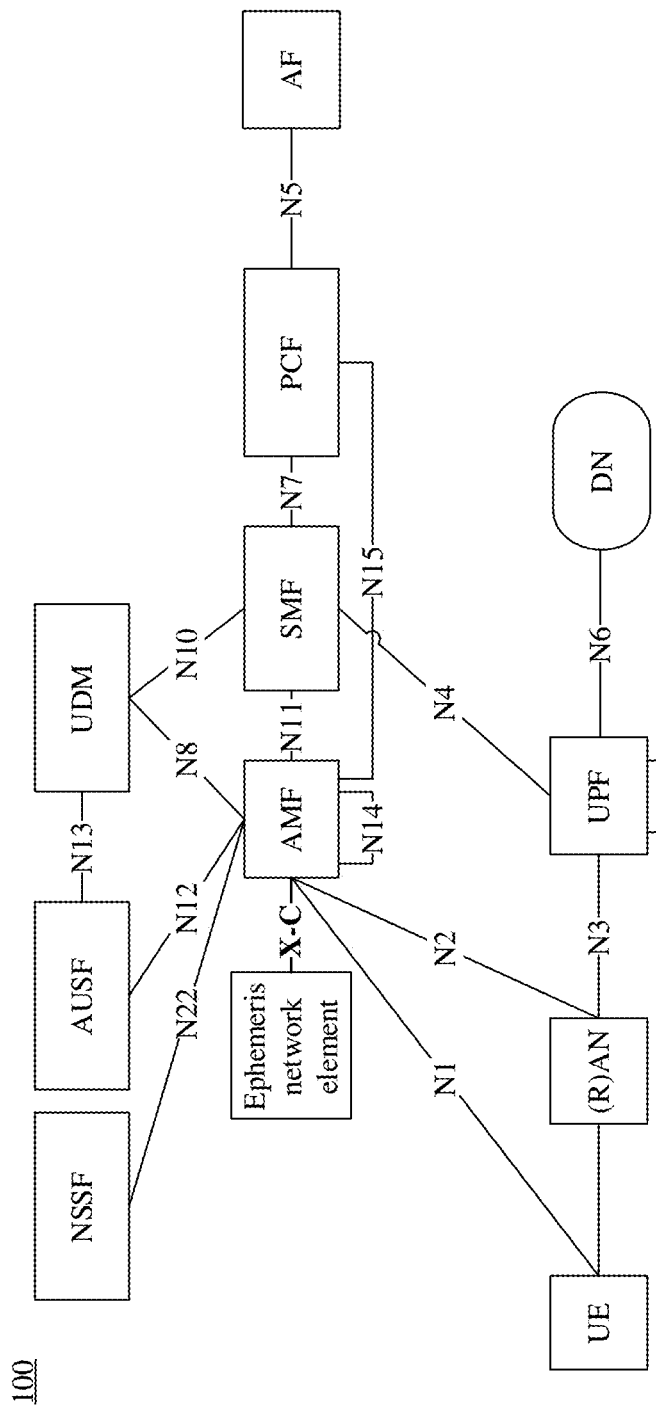
FIG. 1 shows a fifth generation (5G) core network architecture 100 applicable to this application.

FIG. 1 shows a 5G core network architecture 100 applicable to this application. The 5G core network architecture 100 may include at least the following core network elements.

A network slice selection function (NSSF) is responsible for network slice management, and determines an access and mobility management function (AMF) set used to serve UE or determines a candidate AMF list by querying an NRF.

An authentication server function (AUSF) is responsible for authentication management, and supports authentication of 3$^{rd}$ generation partnership project (3GPP) network access and untrusted non-3GPP network access.

A unified data management (UDM) is responsible for user management.

An access and mobility management function (AMF) is responsible for access permission and switching management of the terminal device, including access authorization, switching, cell camping, paging, UE mobility event notification, and the like.

A session management function (SMF) is responsible for session management, and provides service continuity and uninterrupted user experience of a service, including changes in an IP address and/or an anchor.

A policy control function (PCF) is responsible for quality of service (QoS) policy selection and the like.

An application function (AF) is responsible for interacting with a 3GPP core network to provide a service.

A user plane function (UPF) is responsible for a user plane operation such as user data forwarding, a PDU session associated with the UPF may be served by a (R)AN node through an N3 interface between the (R)AN and the UPF, and there is no need to add a new UPF or remove or reallocate a UPF between the (R)AN and the UPF.

Generally, satellites move around the earth in specified orbits, and each satellite corresponds to one set of ephemeris and calendar data, including information such as different space positions of the satellite at different moments. The orbit of the satellite and other settings are continuously fine-adjusted or updated. When the settings are fine-adjusted or updated, the ephemeris data corresponding to the satellite is also updated accordingly. This application provides a satellite communication method. An ephemeris management unit is added to a 5G architecture, to form a satellite communications network. The ephemeris management unit is responsible for ephemeris management, is connected to a mobile management unit, a satellite ground management unit, a cellular base station, and a satellite that are in a cellular network through corresponding interfaces, and is configured to exchange ephemeris information of the satellite network.

Figure 2:
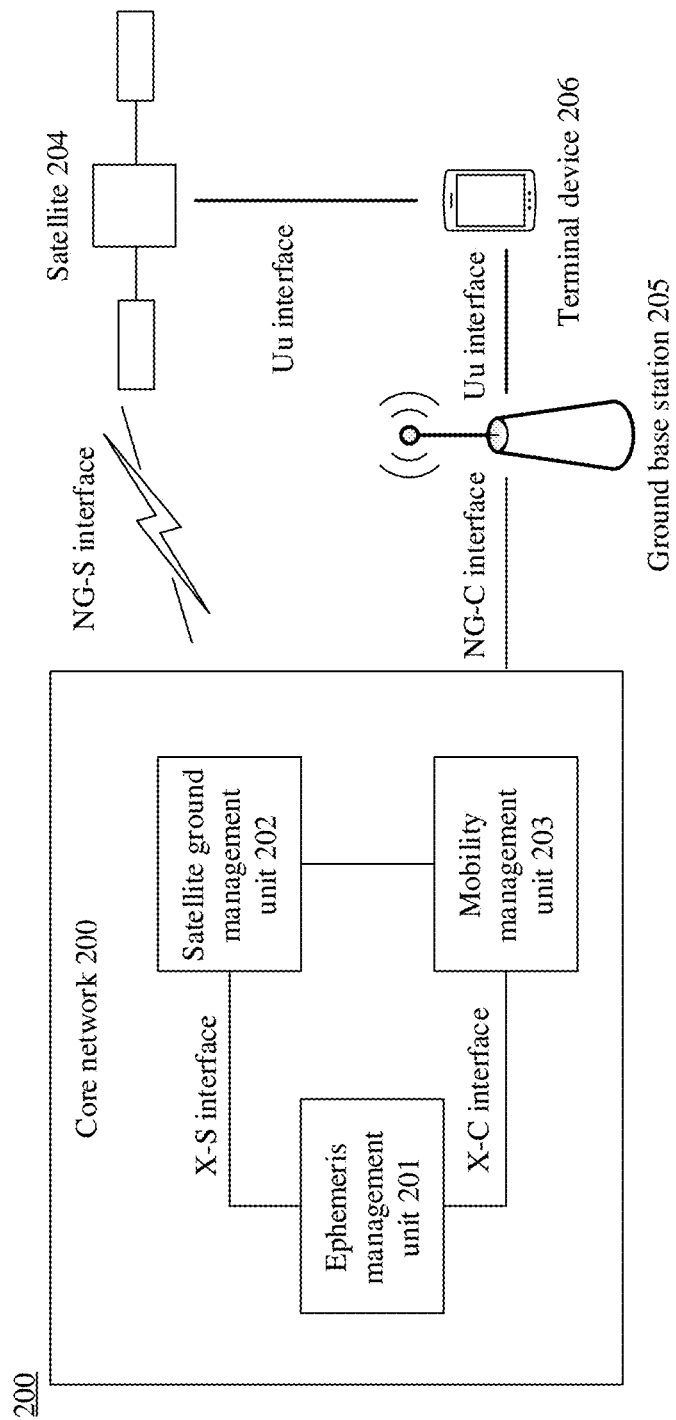
FIG. 2 is a schematic structural diagram of a satellite communications network according to Embodiment 1 of this application.

FIG. 2 is a schematic structural diagram of a satellite communications network according to an embodiment of this application.

In FIG. 2, an ephemeris management unit 201 is connected to a satellite ground management unit 202 through an X-S interface, and is connected to a mobility management unit 203 through an X-C interface. The satellite ground management unit 202 communicates with a satellite 204 through an NG-S interface, and the mobility management unit 203 communicates with a ground base station 205 through an NG-C interface. In the figure, a terminal device 206 separately communicates with the satellite 204 and the ground base station 205 through Uu interfaces.

The functions of the interfaces between the network elements shown in FIG. 2 are as follows.

(1) A Uu interface is configured to connect a cellular access network node and a terminal device or connect a satellite access network node and a terminal device, and is responsible for control plane and user plane transmission between the cellular access network node and the terminal device or between the satellite access network node and the terminal device.

(2) An NG-C interface is configured to connect a cellular access network node and a core network node, and is responsible for control plane and user plane transmission between the cellular access network node and the core network node, where the core network node includes a mobility management unit, a data gateway, and the like.

(3) An NG-S interface is configured to connect a satellite access network node and a core network node, and is responsible for control plane and user plane transmission between the satellite access network node and the core network node, where the core network node includes a satellite ground management unit, a data gateway, and the like.

(4) An NG-X interface is configured to connect a cellular access network node and an ephemeris management unit in a core network node, and is responsible for control plane and user plane transmission between the cellular access network node and the ephemeris management unit in the core network node.

(5) An X-S interface is configured to connect an ephemeris management unit and a core network node, and is responsible for control plane transmission between the ephemeris management unit and the core network node.

(6) An X-C interface is configured to connect an ephemeris management unit and a core network node, and is responsible for control plane transmission between the ephemeris management unit and the core network node.

In a cellular network, an interface between a wireless access point and a core network element is physically carried by an optical fiber, and has a large bandwidth. Therefore, a problem caused by overheads of a header of an upper-layer data packet does not need to be considered. In a non-terrestrial network (NTN) scenario, a corresponding interface needs to be implemented, by using a radio link, between an access point deployed on an NTN platform and a core network element deployed on the ground. In this case, overheads of a header of upper-layer protocol data become a problem that needs to be considered. In this way, wireless bandwidth resources are saved. The NG-S interface in this embodiment is configured to connect a satellite access network node and a ground core network node, and a new interface protocol needs to be designed to meet a requirement. Therefore, this application provides a new interface protocol, to meet a requirement of communication between a satellite access network node and a ground core network node in the satellite communications network provided in this application.

Figure 3:
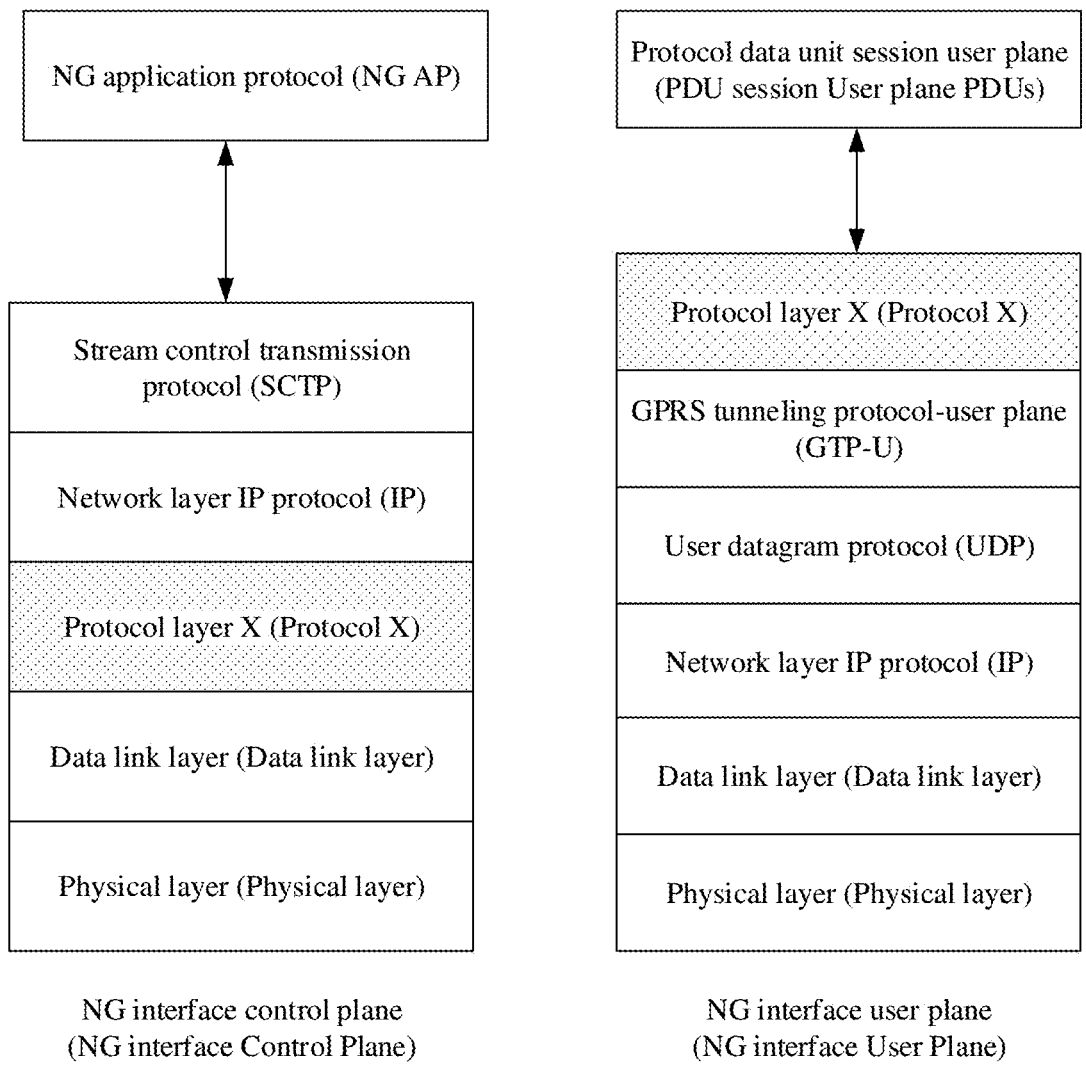
FIG. 3 is a schematic structural diagram of a control plane protocol stack and a user plane protocol stack of an NG-S interface applicable to an embodiment of this application.

FIG. 2 provides a structure of the satellite network. The ephemeris management unit 201 may be integrated into the satellite ground management unit 202, the ephemeris management unit 201 may be integrated into the mobility management unit 203, the ephemeris management unit integrates functions of the satellite ground management unit 202 and the mobility management unit 203, or the ephemeris management unit performs all functions of the mobility management unit 203. In addition, the ephemeris management unit 201, the satellite ground management unit 202, or the mobility management unit 203 is independent of the core network. FIG. 3 is a schematic structural diagram of a control plane protocol stack and a user plane protocol stack of an NG-S interface applicable to a non-terrestrial network NTN.

The left frame in FIG. 3 is the control plane protocol stack of the NG-S interface, and the control plane protocol stack is as follows from bottom to top.

Physical layer: The physical layer provides all functions required for bit stream transmission in a physical medium and provides services of information transmission for a data link layer and an upper layer.

Data link layer: The data link layer is responsible for functions such as channel management and mapping, data packet encapsulation and decapsulation, data scheduling, and priority management.

Protocol X: The protocol X is a newly added protocol layer, and is responsible for functions such as upper-layer packet header compression, integrity protection, encryption, and decryption.

IP: The IP is a network layer protocol and is responsible for data packet routing.

SCTP: The SCTP is a transport layer protocol, providing reliable transmission for application layer messages.

NG AP: The NG AP is an application-layer signaling protocol.

The right frame in FIG. 3 is the user plane protocol stack of the NG-S interface, and the user plane protocol stack is as follows from bottom to top.

Physical layer: The physical layer provides all functions required for bit stream transmission in a physical medium and provides services of information transmission for a data link layer and an upper layer.

Data link layer: The data link layer is responsible for functions such as channel management and mapping, data packet encapsulation and decapsulation, data scheduling, and priority management.

IP: The IP is a network layer protocol and is responsible for data packet routing.

User datagram protocol: The user datagram protocol is a connectionless transport layer protocol in an OSI (OSI) reference model.

GTP-U: The GTP-U transfers a user plane PDU between a gNB deployed on an NTN platform and a UPF deployed on a ground gateway.

Protocol X: The protocol X is a newly added protocol layer, and is responsible for functions such as upper-layer packet header compression, integrity protection, encryption, and decryption.

Protocol data unit: The protocol data unit includes information about an upper-layer protocol and additional information about a current protocol layer.

A specific implementation of the NG-S interface protocol is: Protocol layers that are in a one-to-one correspondence for a base station deployed on an NTN platform and a core network element deployed on a ground gateway.

A control plane is used as an example. When a core network element sends signaling to a base station, the signaling message is first processed by each protocol layer on the core network element side, and is sent to a physical layer of the base station through a physical layer. After the signaling message is processed by each protocol layer of the base station, the base station parses the signaling message. Then, the base station performs corresponding processing based on content of the message. The reverse is also true.

In the foregoing method, when the base station sends data, processing performed by each protocol layer of the core network element includes processing, by the physical layer, a received data packet and then sending the data packet to the data link layer, removing, by a data link layer, a corresponding layer packet header, extracting a corresponding data packet from a GTP-U tunnel, transmitting the data packet to a protocol X layer, and sequentially decompressing, by the protocol X layer, compressed upper-layer protocol (such as IP) packet headers, to obtain an original data packet sent by the base station.

A user plane is used as an example. When a base station side sends data to a core network element, the base station sends, from a physical layer of the base station, a data packet processed by each protocol layer of the base station to a physical layer of the core network element, and each protocol layer of the core network element processes the received data packet to obtain an original data packet sent by the base station. The reverse is also true.

In the foregoing method, when the base station sends data, processing on the user data packet performed by each protocol layer on the base station side includes performing, by a protocol X protocol layer, header compression on upper-layer protocol data (such as IP), performing encapsulation by using a GTP-U tunneling protocol, transmitting the data to a data link layer, selecting, by the data link layer, an appropriate transmission mode, and sending, by the physical layer, the data packet to the physical layer of the core network element based on the selected transmission mode.

A method for applying the control plane protocol stack of the NG-S interface to the following embodiment of this application is as follows Signaling exchanged between a satellite and a core network element is encapsulated based on an NG AP (application protocol) application layer signaling protocol, and is transmitted through a radio link after being encapsulated by using protocols at all layers of the protocol stack.

A method for applying the user plane protocol stack of the NG-S interface to the following embodiments of this application is User data, an ephemeris, and the like that are sent by a satellite to a core network element are carried by a PDU, and are transmitted to a ground core network element through a radio link after being encapsulated by using protocols at all layers of the protocol stack.

The NG-S interface protocol may be used for connecting a satellite access network node and a ground core network node in the following embodiments, and is responsible for control plane and user plane transmission between the satellite access network node and the ground core network node. In addition, the NG-S interface protocol may be further used for inter-satellite link communication between two satellites.

Based on the satellite network in FIG. 2, an embodiment of this application provides a satellite communication method, including the following steps.

Step 1: An ephemeris management unit obtains ephemeris information of a satellite in a satellite network, where the ephemeris information of the satellite in the satellite network includes one or more of the following information, including a beam parameter of the satellite in the satellite network, a physical resource of the satellite in the satellite network, scheduling information of the satellite in the satellite network, and the like.

Step 2: The ephemeris management unit generates a first message based on the ephemeris information of the satellite in the satellite network, where the first message includes ephemeris information of one or more satellites that serve a terminal device.

Step 3: When the terminal device performs random access, the ephemeris management unit sends the first message, to implement communication between the terminal device and the satellite.

Further, that an ephemeris management unit obtains ephemeris information of a satellite in a satellite network specifically includes the ephemeris management unit obtains the ephemeris information of the satellite in the satellite network through a first interface, where the first interface includes an NG-S interface or an X-S interface.

Further, that the ephemeris management unit sends the first message when the terminal device performs random access specifically includes when the terminal device performs random access, the ephemeris management unit sends the first message through a second interface, where the second interface includes an NG-C interface, an X-C interface, or an NG-X interface.

Further, the foregoing method further includes the ephemeris management unit obtains an ephemeris request message of the terminal device, where the ephemeris request message is used to request the ephemeris information of the one or more satellites that serve the terminal device.

Based on the satellite communications network in FIG. 2, an embodiment of this application provides a satellite communication method. A difference between this method and the foregoing embodiment lies in that the method is described based on a terminal device. Details are as follows.

Step 1: When the terminal device performs random access, the terminal device sends an ephemeris request message, where the ephemeris request message is used to request ephemeris information of one or more satellites that serve the terminal device, and the ephemeris information includes one or more of the following information, including a beam parameter of the satellite that serves the terminal device, a physical resource of the satellite that serves the terminal device, and scheduling information of the satellite that serves the terminal device.

Step 2: The terminal device obtains a first message, where the first message includes the ephemeris information of the one or more satellites that serve the terminal device.

Step 3: The terminal device obtains, based on the first message, ephemeris information of the satellite that communicates with the terminal device.

Step 4: The terminal device establishes a communication connection between the terminal device and the satellite based on the obtained ephemeris information of the satellite that communicates with the terminal device.

Step 5: The terminal device communicates with the satellite by using the established communication connection.

Further, that the terminal device obtains a first message specifically includes the terminal device obtains the first message through an NG-C interface, an X-C interface, or an NG-X interface.

Further, that the terminal device obtains, based on the first message, ephemeris information of the satellite that communicates with the terminal device specifically includes the terminal device selects, based on the first message, the satellite that communicates with the terminal device, and the terminal device obtains the ephemeris information of the selected satellite based on the selected satellite.

Further, the ephemeris request message is a random access message or uplink control information (UCI).

The following separately describes the foregoing two embodiments by using examples with reference to different scenarios.

In FIG. 2, the ephemeris management unit is separately connected to the satellite ground management unit and the mobility management unit. The ephemeris management unit, the satellite ground management unit, and the mobility management unit are deployed in a core network. The following further describes a procedure of a satellite communication method based on an architecture of the satellite network with reference to FIG. 4.

Figure 4:
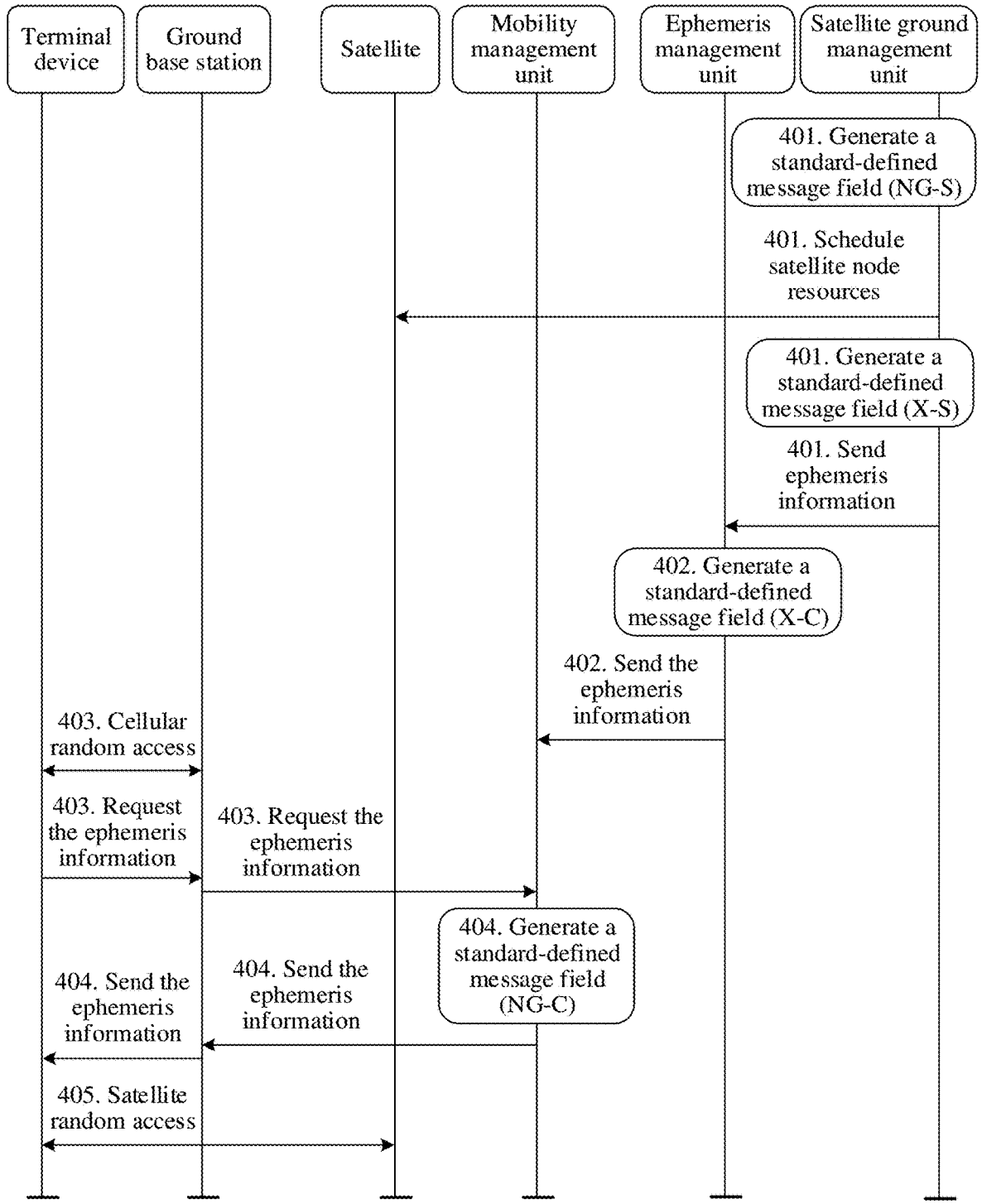
FIG. 4 is a schematic diagram of a communication procedure in a satellite communications network according to Embodiment 1 of this application.

FIG. 4 is a schematic flowchart of a satellite communication method according to an embodiment of this application. The method includes the following steps.

401: The satellite ground management unit obtains ephemeris information of a satellite in a satellite network, and transmits the ephemeris information to the ephemeris management unit through an X-S interface.

The ephemeris information of the satellite in the satellite network may be obtained in one or more of the following manners, including the ephemeris information of the satellite in the satellite network may be periodically obtained, the ephemeris information of the satellite in the satellite network may be ephemeris information obtained through real-time update after a signal of an over-the-top satellite is received, or the ephemeris information of the satellite in the satellite network may be triggered by a core network element.

The ephemeris information of the satellite in the satellite network may include one or more types of the following information, including (1) satellite beam parameters, including a quantity of beams, a beam angle, a beam inclination, a beam ID, and a tracking area list, (2) satellite physical resources, including a working bandwidth, a working frequency, and a carrier spacing, and (3) satellite scheduling status, including a quantity of currently accessed terminal devices, and occupation of a time domain resource, a frequency domain resource, a code domain resource, and a beam resource, and the like.

Further, the ephemeris information of the satellite in the satellite network may further include one or a combination of the following information, including (4) satellite identity ID, (5) satellite working status, including an active state, an idle state, an offline state, and the like, and (6) satellite orbit parameters, including an orbit height, an orbit inclination, and the like.

The X-S interface is configured to connect the satellite ground management unit 202 and the ephemeris management unit 201, and is responsible for control plane transmission between the satellite ground management unit 202 and the ephemeris management unit 201.

402: The ephemeris management unit transmits the obtained ephemeris information to the mobility management unit through an X-C interface.

The X-C interface is configured to connect the ephemeris management unit 201 and the mobility management unit 203, and is responsible for control plane transmission between the ephemeris management unit 201 and the mobility management unit 203.

403: The terminal device performs random access to a cellular network, and sends ephemeris request information to the mobility management unit via the ground base station.

Optionally, the ephemeris request information may be carried in contention-based random access signaling Msg1 or Msg3 by the terminal device 206, and delivered by the ground base station 205 on an agreed resource or a scheduled resource.

Optionally, the ephemeris request information may alternatively be carried in uplink control information (uplink control information, UCI) by the terminal device 206, and delivered by the ground base station 205 on an agreed resource or a scheduled resource.

404: The mobility management unit transmits the ephemeris information to the ground base station through an NG-C interface, and then the ground base station transmits the ephemeris information to the terminal device by using control plane signaling.

Optionally, the ephemeris information may be all ephemeris information at a current moment.

Optionally, the ephemeris information may be some ephemeris information at a current moment.

Optionally, the ephemeris information may alternatively be ephemeris information obtained after updating ephemeris information stored on the terminal device side.

The NG-C interface is configured to connect the mobility management unit 203 and the ground base station 205, and is responsible for control plane and user plane transmission between the mobility management unit 203 and the ground base station 205.

405: The terminal device selects a satellite based on the ephemeris information, completes random access, and establishes a connection to the satellite.

In this embodiment of this application, the terminal device obtains the ephemeris information in advance by using the signaling of the ground base station in the satellite network. Therefore, a satellite and an idle resource of the satellite can be quickly selected, and a connection to the satellite can be established or switching to the over-the-top satellite can be completed, thereby ensuring stability of satellite communication.

The following embodiment of this application provides a satellite communications network. A terminal device maintains dual-connectivity communication with a satellite and a ground base station. In the embodiment shown in FIG. 4, the ephemeris management unit may be independent of the satellite ground management unit and the mobility management unit. Different from the embodiment shown in FIG. 4, in this embodiment, an ephemeris management unit is integrated into a satellite ground management unit, and is a functional module inside the satellite ground management unit. The ephemeris information is exchanged between the satellite ground management unit and a mobility management unit.

Figure 5:
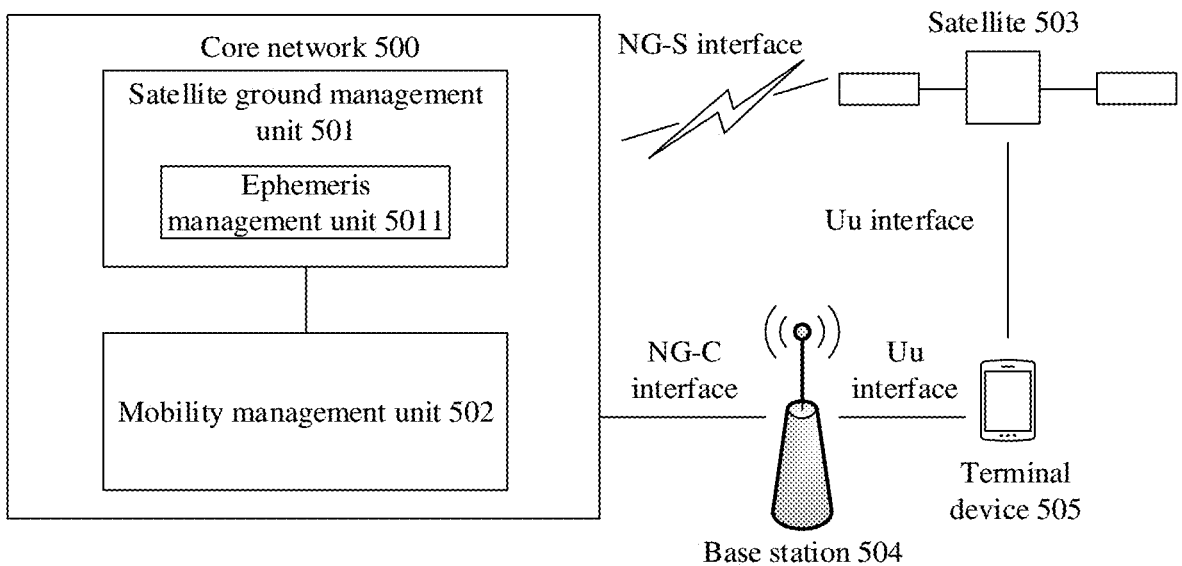
FIG. 5 is a schematic structural diagram of a satellite communications network according to Embodiment 2 of this application.

In FIG. 5, a function of the ephemeris management unit is integrated into the satellite ground management unit, and the satellite ground management unit is connected to the mobility management unit. The following further describes a procedure of a satellite communication method with reference to FIG. 6.

FIG. 5 is a schematic structural diagram of a satellite communications network according to an embodiment of this application.

In FIG. 5, an ephemeris management module 5011 is a functional module inside a satellite ground management unit 501, and a function of the ephemeris management module 5011 is implemented by the satellite ground management unit 501 in this embodiment. The satellite ground management unit 501 may communicate with a mobility management unit 502. The satellite ground management unit 501 communicates with a satellite 503 through an NG-S interface, and the mobility management unit 502 communicates with a ground base station 504 through an NG-C interface. In the figure, a terminal device 505 separately communicates with the satellite 503 and the ground base station 504 through Uu interfaces.

Figure 6:
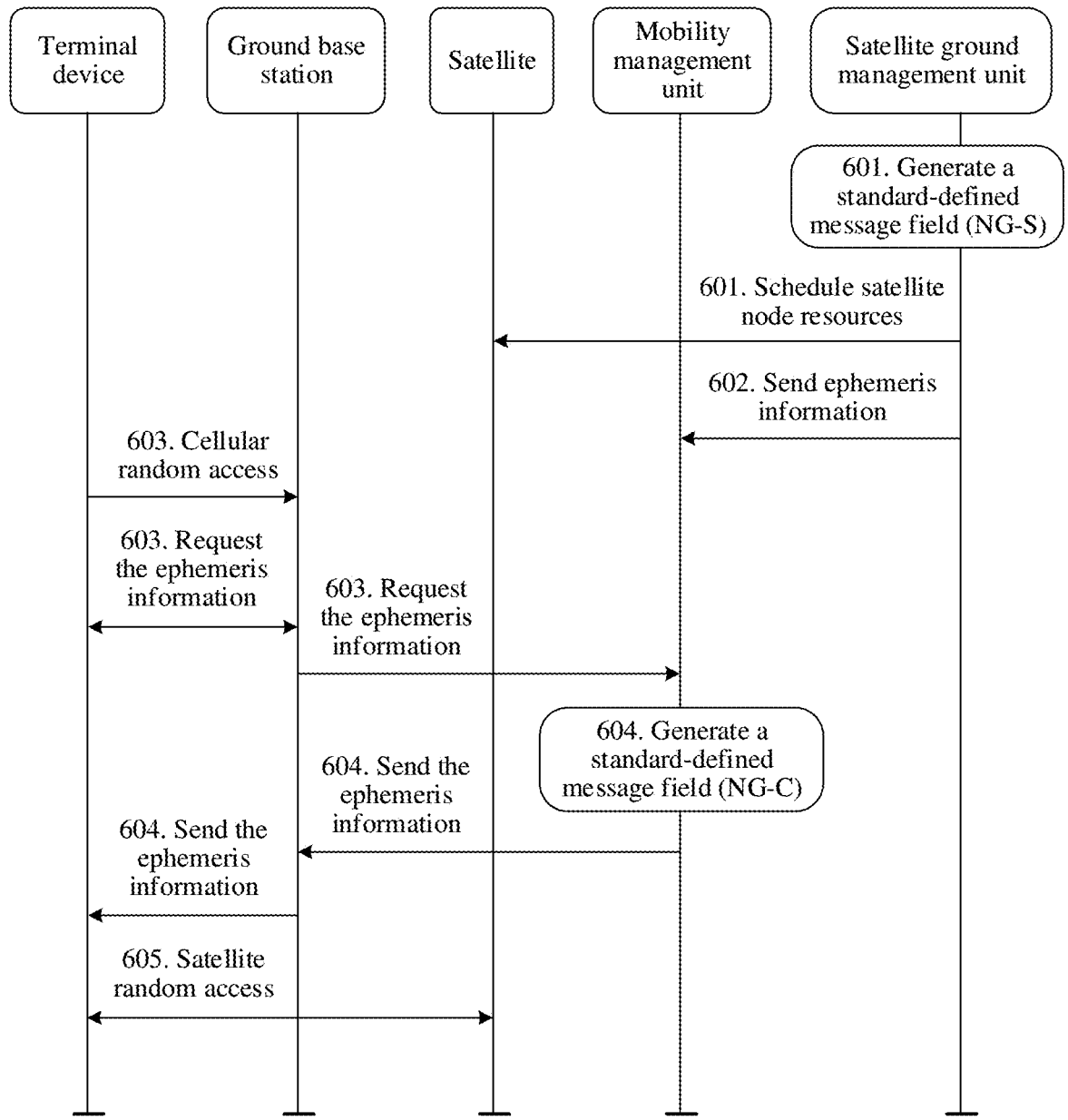
FIG. 6 is a schematic diagram of a communication procedure in a satellite communications network according to Embodiment 2 of this application.

Based on the satellite communications network in FIG. 5, FIG. 6 is a schematic flowchart of a satellite communication method according to an embodiment of this application. The method includes the following steps.

601: The satellite ground management unit obtains ephemeris information of a satellite in a satellite network.

Optionally, the ephemeris information of the satellite in the satellite network may be periodically obtained.

Optionally, the ephemeris information of the satellite in the satellite network may be ephemeris information obtained through real-time update after a signal of an over-the-top satellite is received.

Optionally, the ephemeris information of the satellite in the satellite network may be triggered by a core network element.

The ephemeris information of the satellite in the satellite network may include one or more of the following information, including (1) satellite beam parameters, including a quantity of beams, a beam angle, a beam inclination, a beam ID, and a tracking area list, (2) satellite physical resources, including a working bandwidth, a working frequency, and a carrier spacing, and (3) satellite scheduling status, including a quantity of currently accessed terminal devices, and occupation of a time domain resource, a frequency domain resource, a code domain resource, and a beam resource, and the like.

Further, the ephemeris information of the satellite in the satellite network may further include one or a combination of the following information, including (4) satellite identity ID, (5) satellite working status, including an active state active, an idle state idle, an offline state offline, and the like, and (6) satellite orbit parameters, including an orbit height, an orbit inclination, and the like.

602: The satellite ground management unit transmits the obtained ephemeris information to the mobility management unit in a cellular network.

603: The terminal device performs random access to the cellular network, and sends ephemeris request information to the mobility management unit via the ground base station.

Optionally, the ephemeris request information may be carried in contention-based random access signaling Msg1 or Msg3 by the terminal device 505, and delivered by the ground base station 504 on an agreed resource or a scheduled resource.

Optionally, the ephemeris request information may alternatively be carried in uplink control information (UCI) by the terminal device 505, and delivered by the ground base station 504 on an agreed resource or a scheduled resource.

604: The mobility management unit transmits the ephemeris information to the ground base station through an NG-C interface, and then the ground base station transmits the ephemeris information to the terminal device by using control plane signaling.

Optionally, the ephemeris information may be all ephemeris information at a current moment.

Optionally, the ephemeris information may be some ephemeris information at a current moment.

Optionally, the ephemeris information may alternatively be ephemeris information obtained after updating ephemeris information stored on the terminal device side.

The NG-C interface is configured to connect the mobility management unit 502 and the ground base station 504, and is responsible for control plane and user plane transmission between the mobility management unit 502 and the ground base station 504.

605: The terminal device selects a satellite based on the ephemeris information, completes random access, and establishes a connection to the satellite.

Beneficial effects of the satellite communications network in this embodiment of this application are roughly the same as those in the embodiment in FIG. 4. Compared with the embodiment shown in FIG. 4, the ephemeris management unit is integrated into the satellite ground management unit as a software/hardware functional module, instead of serving as an independent new network element, and correspondingly, no new interface needs to be added, thereby reducing complexity of core network deployment and maintenance.

The following embodiment of this application provides a satellite communications network. A terminal device maintains dual-connectivity communication with a satellite and a ground base station. Different from the embodiment in FIG. 4, a newly added network element, that is, an ephemeris management unit, is newly added to a core network. The network element communicates with a mobile base station and a ground management unit in a satellite network through a newly added NG-X interface and a newly added X-S interface, and exchanges ephemeris information of the satellite network.

Figure 7:
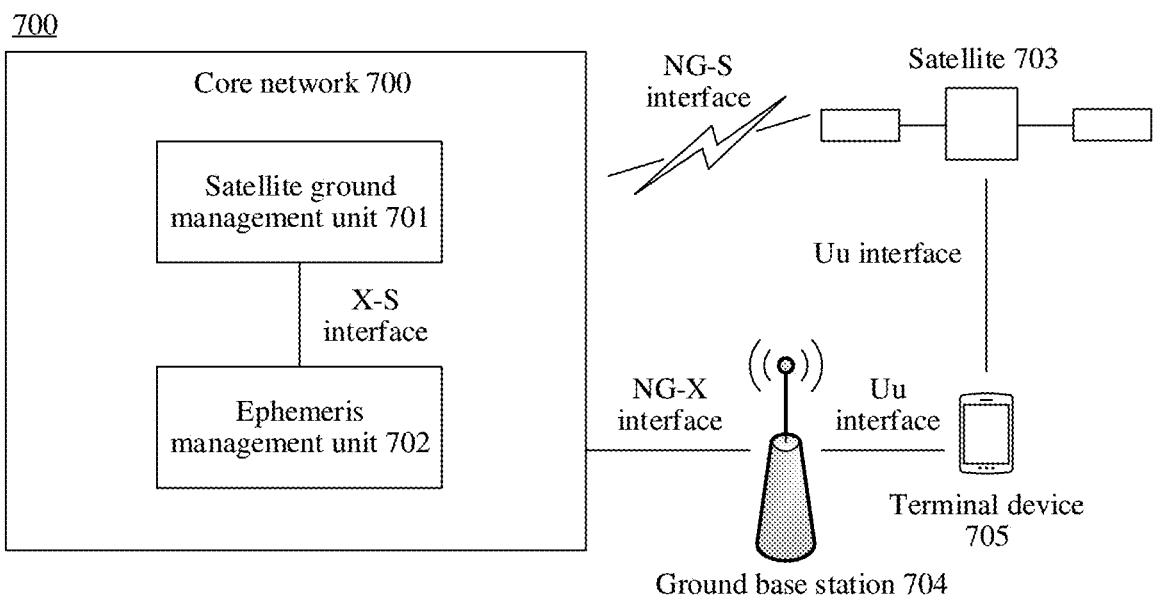
FIG. 7 is a schematic structural diagram of a satellite communications network according to Embodiment 3 of this application.

In FIG. 7, the ephemeris management unit replaces the mobility management unit and is connected to the satellite ground management unit. The following further describes a procedure of a satellite communication method based on the satellite network architecture with reference to FIG. 8.

In addition, a function of the ephemeris management unit may also be integrated into the mobility management unit, and the mobility management unit is connected to the satellite ground management unit, to implement satellite communication. Alternatively, the ephemeris management unit may replace the mobility management unit and the satellite ground management unit, and functions of the mobility management unit and the satellite ground management unit are implemented by using the ephemeris management unit.

An example in which an ephemeris management unit replaces a mobility management unit is used below to describe a satellite communication method provided in this application. FIG. 7 is a schematic structural diagram of a satellite communications network according to an embodiment of this application.

In FIG. 7, a satellite ground management unit 701 is connected to an ephemeris management unit 702 through an X-S interface. The satellite ground management unit 701 communicates with a satellite 703 through an NG-S interface. The ephemeris management unit 702 communicates with a ground base station 704 through an NG-X interface. A terminal device 705 separately communicates with the satellite 703 and the ground base station 704 through Uu interfaces.

Figure 8:
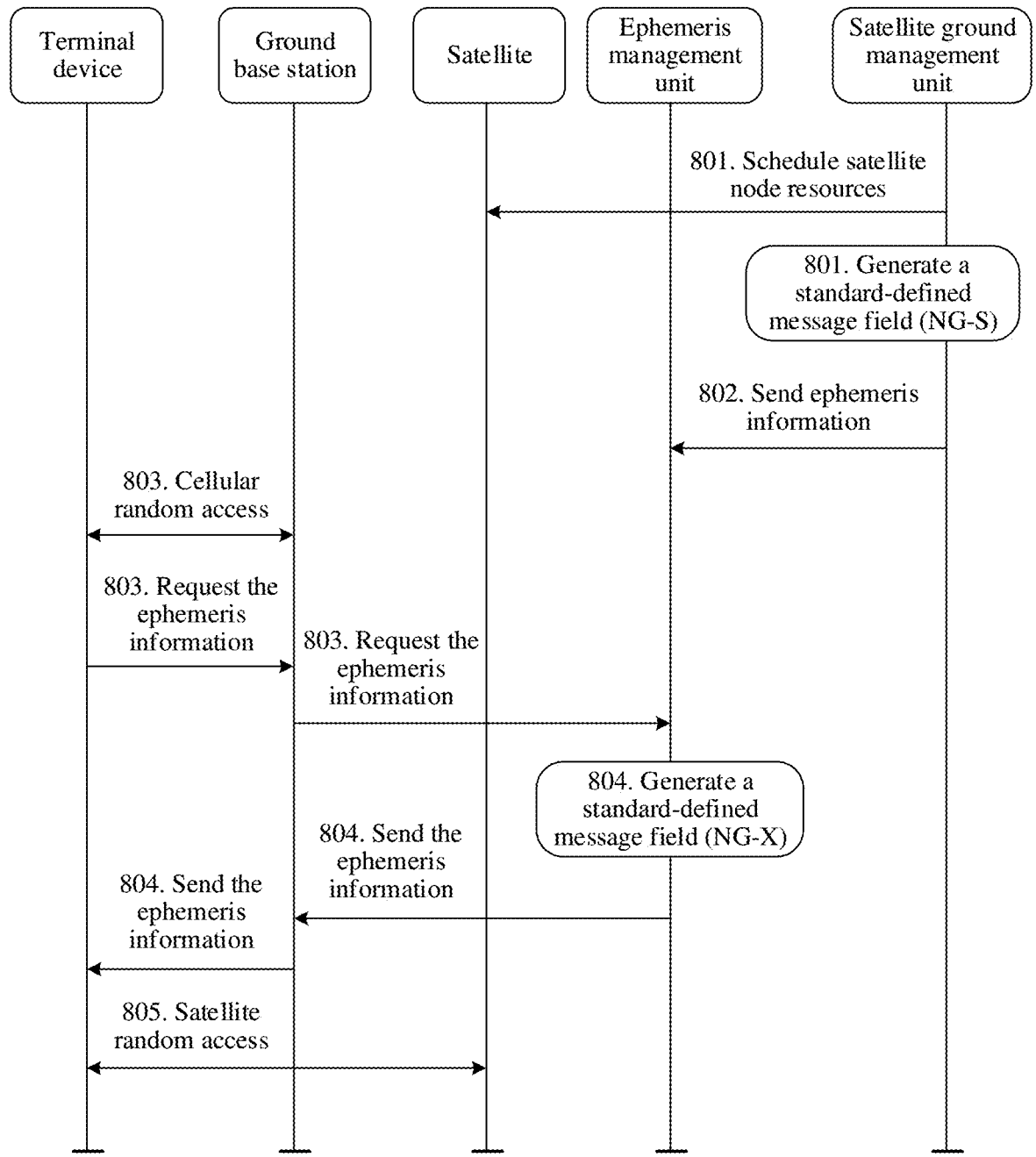
FIG. 8 is a schematic diagram of a communication procedure in a satellite communications network according to Embodiment 3 of this application.

Based on the satellite communications network in FIG. 7, FIG. 8 is a schematic flowchart of a satellite communication method according to an embodiment of this application. The method includes the following steps.

801: The satellite ground management unit obtains ephemeris information of a satellite in a satellite network.

Optionally, the ephemeris information of the satellite in the satellite network may be periodically obtained.

Optionally, the ephemeris information of the satellite in the satellite network may be ephemeris information obtained through real-time update after a signal of an over-the-top satellite is received.

Optionally, the ephemeris information of the satellite in the satellite network may be triggered by a core network element.

The ephemeris information of the satellite in the satellite network may include one or more of the following information, including (1) satellite beam parameters, including a quantity of beams, a beam angle, a beam inclination, a beam ID, and a tracking area list, (2) satellite physical resources, including a working bandwidth, a working frequency, and a carrier spacing, and (3) satellite scheduling status, including a quantity of currently accessed terminal devices, and occupation of a time domain resource, a frequency domain resource, a code domain resource, and a beam resource, and the like.

Further, the ephemeris information of the satellite in the satellite network may further include one or a combination of the following information, including (4) satellite identity ID, (5) satellite working status, including an active state active, an idle state idle, an offline state offline, and the like, and (6) satellite orbit parameters, including an orbit height, an orbit inclination, and the like.

802: The satellite ground management unit transmits the obtained ephemeris information to the ephemeris management unit through an X-S interface.

The X-S interface is configured to connect the satellite ground management unit 701 and the ephemeris management unit 702, and is responsible for control plane transmission between the satellite ground management unit 701 and the ephemeris management unit 702.

803: The terminal device performs random access to a cellular network, and sends ephemeris request information to the ephemeris management unit via the ground base station.

Optionally, the ephemeris request information may be carried in contention-based random access signaling Msg1 or Msg3 by the terminal device 705, and delivered by the ground base station 704 on an agreed resource or a scheduled resource.

Optionally, the ephemeris request information may alternatively be carried in uplink control information (UCI) by the terminal device 705, and delivered by the ground base station 704 on an agreed resource or a scheduled resource.

804: The ephemeris management unit transmits the ephemeris information to the ground base station through an NG-X interface, and then the ground base station transmits the ephemeris information to the terminal device by using control plane signaling.

Optionally, the ephemeris information may be all ephemeris information at a current moment.

Optionally, the ephemeris information may be some ephemeris information at a current moment.

Optionally, the ephemeris information may alternatively be ephemeris information obtained after updating ephemeris information stored on the terminal device side.

The NG-X interface is configured to connect the ephemeris management unit 702 and the ground base station 704, and is responsible for control plane and user plane transmission between the ephemeris management unit 702 and the ground base station 704.

805: The terminal device selects a satellite based on the ephemeris information, completes random access, and establishes a connection to the satellite.

Beneficial effects of the satellite communications network in this embodiment of this application are roughly the same as those in the embodiment in FIG. 4. Compared with the embodiment shown in FIG. 4, the ephemeris management unit is connected to the base station through a newly added interface. When the terminal device needs to request the ephemeris information, the terminal device may directly query the ephemeris management unit via the base station, and does not need to query the ephemeris management unit first through the ground base station and then through the mobility management unit as shown in the embodiment shown in FIG. 4, so that the related process is simplified.

In the embodiment in FIG. 4 and the embodiment in FIG. 8, the ephemeris management unit is newly added in the core network. A function of the ephemeris management unit is ephemeris management, and the ephemeris management unit is connected to the mobility management unit, the satellite ground management unit, the cellular base station, and the satellite through corresponding interfaces, and is configured to exchange the ephemeris information of the satellite network. A function of the ephemeris management module in the embodiment in FIG. 6 is the same as that of the ephemeris management unit. The following introduces the embodiment shown in FIG. 10. In this embodiment, an ephemeris management unit introduced in a core network is no longer used for ephemeris management, but is used for assisting in a switching operation of satellite communication.

An embodiment of this application provides a satellite communications network, where a terminal device maintains dual-connectivity communication with a satellite and a ground base station. Different from the embodiment in FIG. 4, a network element, that is, the ephemeris management unit, is newly added in the core network. The network element communicates with a mobility management unit and a ground management unit in a satellite network through a newly added X-C interface and a newly added X-S interface, and is configured to assist in a switching operation in satellite communication.

Figure 9:
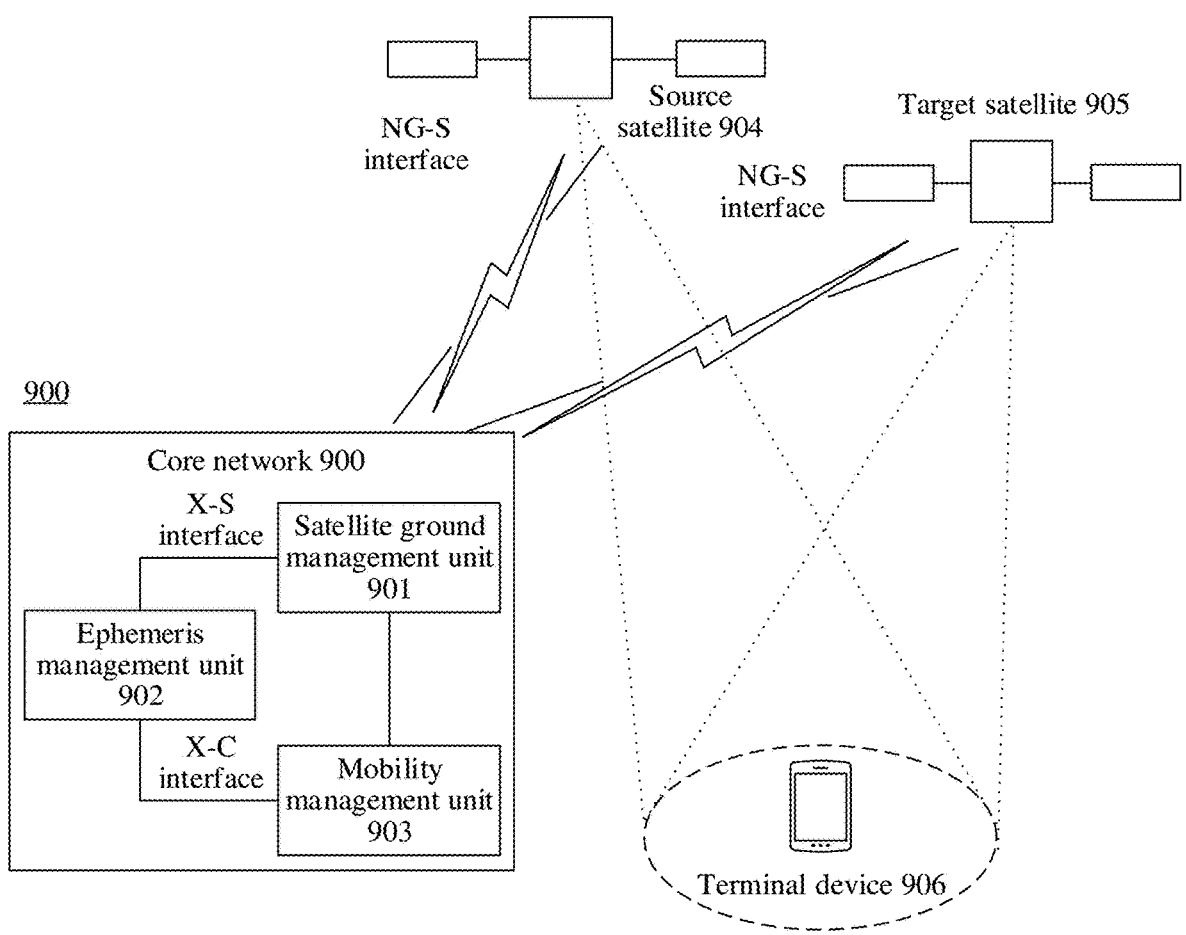
FIG. 9 is a schematic structural diagram of a satellite communications network used to assist in switching according to Embodiment 4 of this application.

FIG. 9 is a schematic structural diagram of a satellite communications network used for a switching operation according to an embodiment of this application.

In FIG. 9, an ephemeris management unit 902 is connected to a satellite ground management unit 901 through an X-S interface, and is connected to a mobility management unit 903 through an X-C interface. The satellite ground management unit 9o1 communicates with a source satellite 904 and a target satellite 905 that is to be switched to through an NG-S interface. In the figure, a terminal device 906 separately communicates with the source satellite 904 and the target satellite 905 through Uu interfaces.

Figure 10:
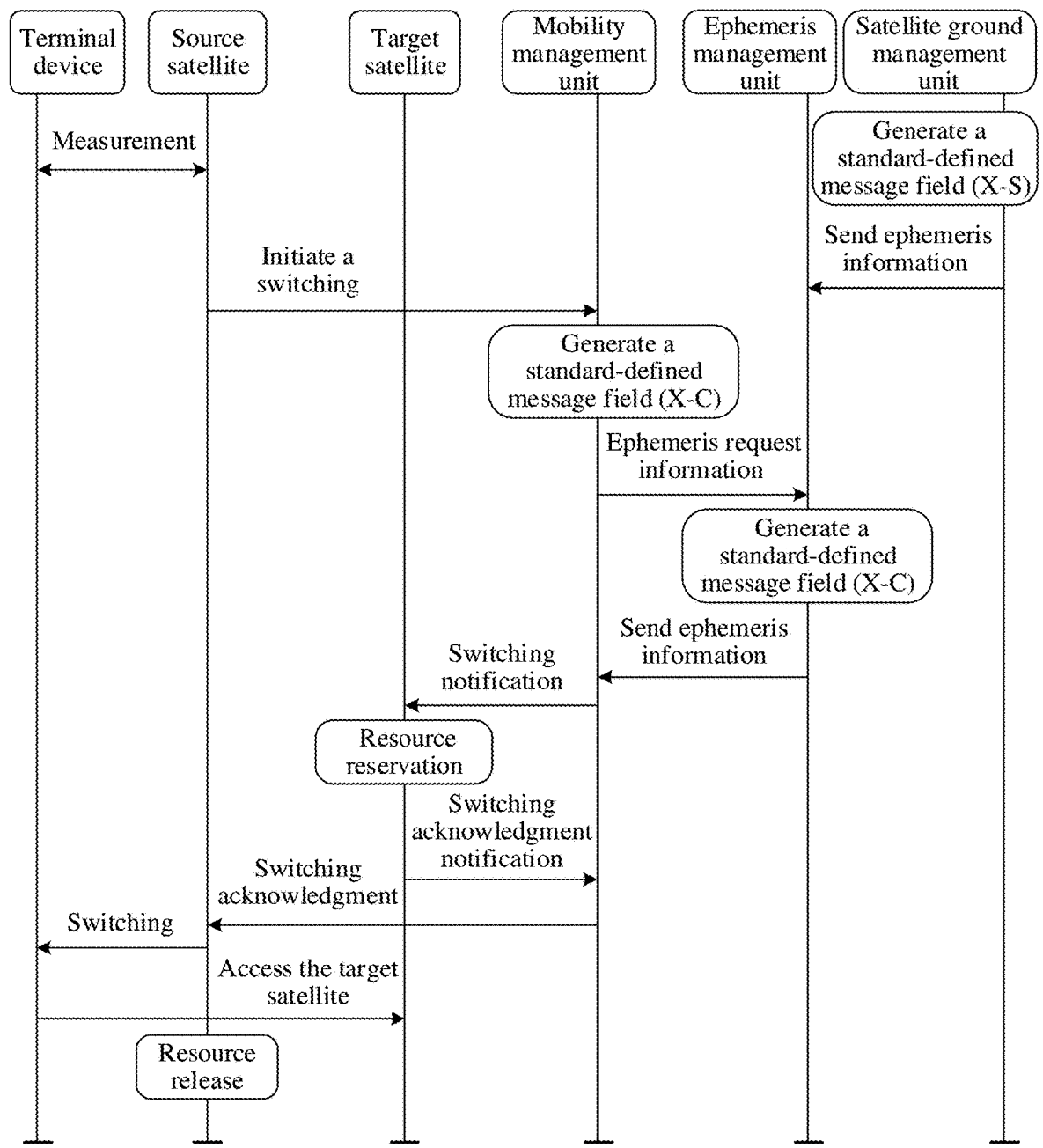
FIG. 10 is a schematic diagram of a communication procedure in a satellite communications network used to assist in switching according to Embodiment 4 of this application.

Based on the satellite communications network in FIG. 9, FIG. 10 is a schematic flowchart of a satellite communication method used for a switching operation according to an embodiment of this application. The method includes the following steps.

1001: The satellite ground management unit obtains ephemeris information of a satellite in a satellite network, and transmits the ephemeris information to the ephemeris management unit through an X-S interface.

Optionally, the ephemeris information of the satellite in the satellite network may be periodically obtained.

Optionally, the ephemeris information of the satellite in the satellite network may be ephemeris information obtained through real-time update after a signal of an over-the-top satellite is received.

Optionally, the ephemeris information of the satellite in the satellite network may be triggered by a core network element.

The ephemeris information of the satellite in the satellite network may include one or more types of the following information, including (1) satellite beam parameters, including a quantity of beams, a beam angle, a beam inclination, a beam ID, and a tracking area list, (2) satellite physical resources, including a working bandwidth, a working frequency, and a carrier spacing, and (3) satellite scheduling status, including a quantity of currently accessed terminal devices, and occupation of a time domain resource, a frequency domain resource, a code domain resource, and a beam resource, and the like.

Further, the ephemeris information of the satellite in the satellite network may further include one or a combination of the following information, including (4) satellite identity ID, (5) satellite working status, including an active state active, an idle state idle, an offline state offline, and the like, and (6) satellite orbit parameters, including an orbit height, an orbit inclination, and the like.

The X-S interface is configured to connect the satellite ground management unit and the ephemeris management unit 902, and is responsible for control plane transmission between the satellite ground management unit and the ephemeris management unit 902.

1002: The ephemeris management unit transmits the obtained ephemeris information to the mobility management unit through an X-C interface.

The X-C interface is configured to connect the ephemeris management unit 902 and the mobility management unit 903, and is responsible for control plane transmission between the ephemeris management unit 902 and the mobility management unit 903.

1003: The terminal device triggers switching based on a measurement result, and a source satellite initiates a switching operation to the mobility management unit or the satellite ground management unit.

Optionally, the switching operation may be triggered by the source satellite 904 based on the measurement result.

Optionally, the switching operation may also be triggered by the mobility management unit 903 based on the ephemeris information.

1004. The mobility management unit requests the ephemeris information from the ephemeris management unit through the X-C interface, and schedules a target satellite resource by using the satellite ground management unit to complete a switching operation.

The X-C interface is configured to connect the mobility management unit 903 and the ephemeris management unit 902, and is responsible for control plane transmission between the mobility management unit 903 and the ephemeris management unit 902.

In this embodiment of this application, the mobility management unit obtains the ephemeris information via the satellite ground station, can quickly select a satellite and an idle resource of the satellite, determines a satellite that is involved in switching, and triggers a corresponding switching operation, thereby improving a success rate and a speed of the switching.

The following briefly describes, with reference to FIG. 11 to FIG. 14, a terminal apparatus, a communications apparatus, and a satellite communication system that are provided in this application, to perform the satellite communication method or procedure provided in the foregoing embodiments. The satellite communication methods provided in the foregoing embodiments are applicable to the apparatuses shown in FIG. 11 to FIG. 14, and details of the foregoing satellite communication methods are not described herein again.

Figure 11:
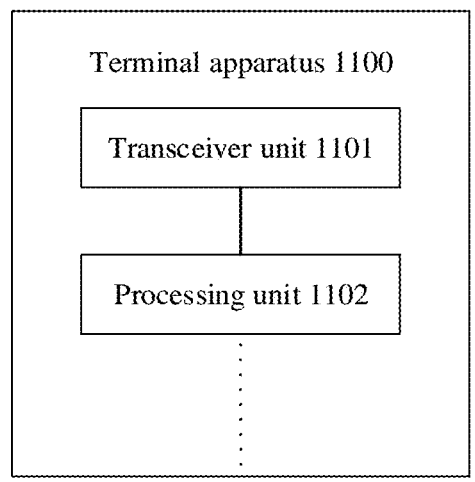
FIG. 11 is a schematic diagram of an apparatus structure of a terminal device 1100 according to this application.

FIG. 11 is a schematic structural diagram of a terminal apparatus 1100 according to this application. The terminal apparatus 1100 includes a transceiver unit 1101, configured to when the terminal apparatus performs random access, send a request message, where the request message is used to request ephemeris information of one or more satellites that serve the terminal apparatus, and the ephemeris information includes one or more of a beam parameter of the satellite that serves the terminal apparatus, a physical resource of the satellite that serves the terminal apparatus, and scheduling information of the satellite that serves the terminal apparatus, obtain a first message, where the first message includes the ephemeris information of the one or more satellites that serve the terminal apparatus, and send data by using a communication connection established between the terminal apparatus and the satellite, and a processing unit 1102, configured to obtain, based on the first message, ephemeris information of the satellite that communicates with the terminal apparatus, and establish the communication connection between the terminal apparatus and the satellite based on the obtained ephemeris information of the satellite that communicates with the terminal apparatus.

The transceiver unit 1101 is specifically configured to obtain the first message through an NG-C interface, an X-C interface, or an NG-X interface.

The processing unit 1102 is specifically configured to select, based on the first message, the satellite that communicates with the terminal apparatus, and obtain the ephemeris information of the selected satellite based on the selected satellite.

Figure 12:
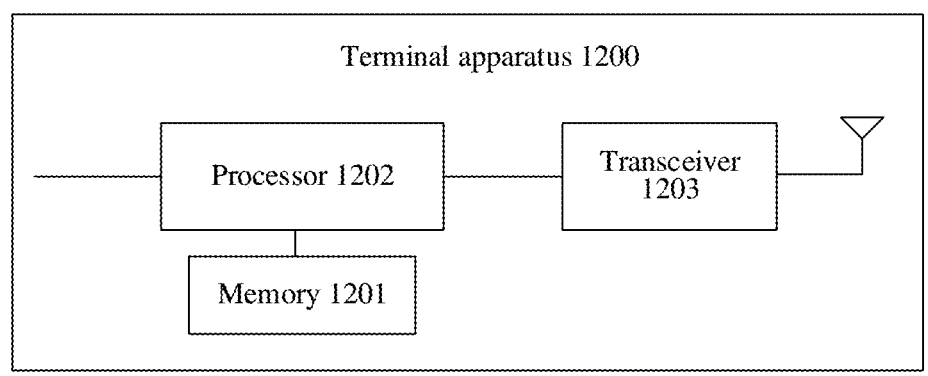
FIG. 12 is a schematic diagram of an apparatus structure of a terminal device 1200 according to this application.

FIG. 12 is a schematic structural diagram of a terminal apparatus 1200 according to this application. The terminal apparatus 1200 includes a memory 12o1, configured to store computer program instructions, and a processor 1202, configured to execute the computer program instructions stored in the memory.

When the computer program instructions are executed, the processor executes the computer program instructions stored in the memory, so that the terminal apparatus implements the satellite communication method related to the terminal device in any one of the foregoing method embodiments.

Optionally, the terminal apparatus 1200 further includes a transceiver 1203. When the program is executed, the processor executes the computer program instructions stored in the memory, so that the transceiver of the terminal apparatus implements the receiving and sending steps in the satellite communication method related to the terminal device in any one of the foregoing method embodiments.

Figure 13:
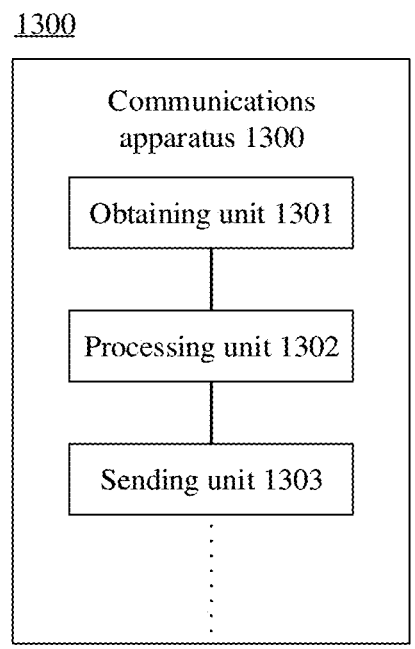
FIG. 13 is a schematic structural diagram of a communications apparatus 1300 according to this application.

FIG. 13 is a schematic structural diagram of a communications apparatus 1300 according to this application. The communications apparatus 1300 includes an obtaining unit 1301, configured to obtain ephemeris information of a satellite in a satellite network, where the ephemeris information of the satellite in the satellite network may include one or more of a beam parameter of the satellite in the satellite network, a physical resource of the satellite in the satellite network, and scheduling information of the satellite in the satellite network, a processing unit 1302, configured to generate a first message based on the ephemeris information of the satellite in the satellite network, where the first message includes ephemeris information of one or more satellites that serve a terminal device, and a sending unit 1303, configured to send the first message when the terminal device performs random access.

The obtaining unit is specifically configured to obtain the ephemeris information of the satellite in the satellite network through a first interface, where the first interface includes an NG-S interface, an X-S interface, or the like, the sending unit is specifically configured to when the terminal device performs random access, send the first message through a second interface, where the second interface includes an NG-C interface, an X-C interface, an NG-X interface, or the like, and the obtaining unit is further configured to obtain a request message of the terminal device, where the request message is used to request the ephemeris information of the one or more satellites that serve the terminal device.

Figure 14:
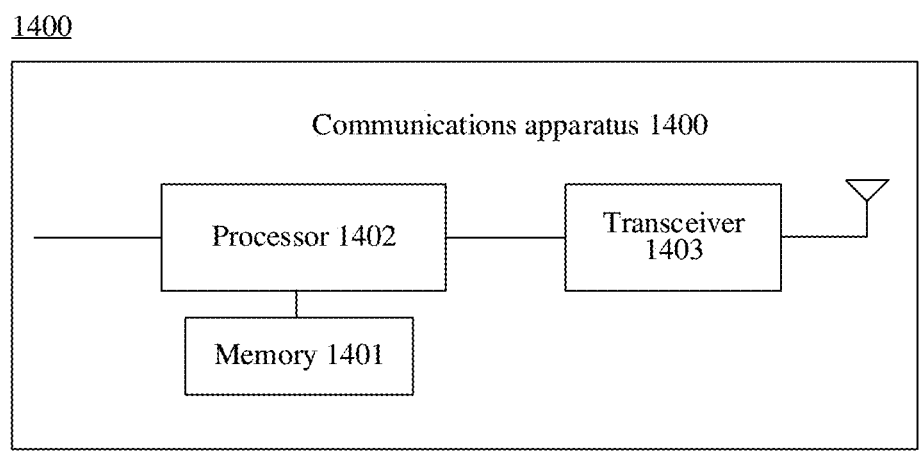
FIG. 14 is a schematic structural diagram of a communications apparatus 1400 according to this application.

FIG. 14 is a schematic structural diagram of a communications apparatus 1400 according to this application. The communications apparatus 1400 includes a memory 1401, configured to store computer program instructions, and a processor 1402, configured to execute the computer program instructions stored in the memory.

When the computer program instructions are executed, the processor executes the computer program instructions stored in the memory, so that the communications apparatus 1400 implements the satellite communication method related to the satellite in any one of the foregoing method embodiments.

Optionally, the communications apparatus 1400 further includes a transceiver 1403. The processor executes the computer program instructions stored in the memory, so that the transceiver 1403 of the communications apparatus implements the receiving and sending steps related to dual-connectivity communication between the satellite and the cellular network in any one of the foregoing method embodiments.

An embodiment of this application further provides a dual-connectivity communications system, including an ephemeris management unit, a satellite network, and a cellular mobile network. The satellite network includes one or more satellites. The cellular mobile network includes a ground base station and a terminal device connected to the ground base station. The ephemeris management unit includes the communications apparatus and the terminal device according to any one of the embodiments shown in FIG. 2 to FIG. 10.

Further, the communications system further includes a satellite ground management unit. The satellite ground management unit is configured to obtain ephemeris information of the satellite in the satellite network through an NG-C interface, and send the ephemeris information of the satellite in the satellite network to the ephemeris management unit through an X-S interface.

Further, the communications system further includes a mobility management unit. The mobility management unit is configured to receive ephemeris information that is of a satellite in the satellite network and that is obtained by the ephemeris management unit through an X-C interface, and send a first message to the base station in the cellular network through an NG-C interface, and forward the first message to the terminal device via the base station.

An embodiment of this application further provides a computer-readable storage medium. The computer-readable storage medium stores computer program instructions. When the computer program instructions are executed by a computer, any satellite communication method provided in this application is implemented.

An embodiment of this application further provides a computer program product. When the computer program product is executed by a computer, any satellite communication method provided in this application is implemented.

An embodiment of this application further provides a system chip. The system chip includes a processing unit and a communications unit. The processing unit may be, for example, a processor. The communications unit may be, for example, an input/output interface, a pin, a circuit, or the like. The processing unit may execute computer instructions, so that a chip in a communications apparatus performs any satellite communication method provided in this application.

In the examples described in the embodiments of this application, units and method processes may be implemented by electronic hardware or a combination of computer software and electronic hardware. Whether the functions are performed by hardware or software depends on particular applications and design constraint conditions of the technical solutions. Persons skilled in the art can implement the described functions by using different methods for each specific application.

In the embodiments provided in this application, it should be understood that the disclosed apparatus and method may be implemented in other manners. The described apparatus embodiments are merely examples. For example, the unit division is merely logical function division and may be other division in actual implementation. For example, a plurality of units or components may be combined or may be integrated into another system. Some steps in the method may be ignored or not performed. In addition, couplings or direct couplings or communication connections between the units may be implemented by using some interfaces, and these interfaces may be implemented in electronic, mechanical, or other forms.

The units described as separate parts may or may not be physically separate, and may be located in one location or may be distributed on a plurality of units. In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape, a USB flash drive, a ROM, a RAM), an optical medium (for example, a CD or DVD), a semiconductor medium (for example, a solid-state drive (solid state disk, SSD)), or the like.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of this application. Although this application is described with reference to the embodiments, in a process of implementing this application that claims protection, persons skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality of. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the protection scope of this application. Correspondingly, the specification and accompanying drawings are merely descriptions of examples of this application defined by the appended claims, and are considered as any or all of modifications, variations, combinations, or equivalents that cover the scope of this application. It is clear that persons skilled in the art can make various modifications and variations to this application without departing from the protection scope of this application. This application is intended to cover these modifications and variations of this application, provided that they fall within the scope of protection defined by the following claims and their equivalent technologies in this application.

What is claimed is:

1. A communication method, comprising:
   obtaining ephemeris information of a satellite in a satellite network, wherein the ephemeris information of the satellite in the satellite network comprises one or more of the following information: a beam parameter of the satellite in the satellite network, a physical resource of the satellite in the satellite network, or scheduling information of the satellite in the satellite network;
   generating a first message based on the ephemeris information of the satellite in the satellite network, wherein the first message comprises ephemeris information of one or more satellites that serve a terminal device; and
   sending the first message, wherein sending the first message causes the terminal device to communicate with the one or more satellites, and the first message is sent in response to the terminal device performing random access to a cellular network.

2. The method according to claim 1, wherein obtaining the ephemeris information of the satellite in the satellite network comprises:
   obtaining the ephemeris information of the satellite in the satellite network through a first interface, wherein the first interface comprises an NG-S interface.

3. The method according to claim 1, wherein sending the first message comprises:
   sending the first message through a second interface, wherein the second interface comprises an NG-C interface.

4. The method according to claim 1, further comprising:
   obtaining an ephemeris request message of the terminal device, wherein the ephemeris request message requests the ephemeris information of the one or more satellites that serve the terminal device.

5. The method according to claim 1, wherein obtaining the ephemeris information of the satellite in the satellite network comprises:
   obtaining the ephemeris information of the satellite in the satellite network through a first interface, wherein the first interface comprises an X-S interface.

6. The method according to claim 1, wherein sending the first message comprises:
   sending the first message through a second interface, wherein the second interface comprises an X-C interface.

7. The method according to claim 1, wherein sending the first message comprises:
   sending the first message through a second interface, wherein the second interface comprises an NG-X interface.

8. The method according to claim 1, wherein the first message is sent to the terminal device by a ground base station.

9. A communication method, comprising:
sending, by a terminal device, an ephemeris request message, wherein the ephemeris request message requests ephemeris information of one or more satellites that serve the terminal device, the ephemeris information comprises one or more of the following information: a beam parameter of the one or more satellites that serve the terminal device, a physical resource of the one or more satellites that serve the terminal device, or scheduling information of the one or more satellites that serve the terminal device, and wherein the ephemeris request message is sent in response to the terminal device performing random access to a cellular network;
obtaining, by the terminal device, a first message, wherein the first message comprises the ephemeris information of the one or more satellites that serve the terminal device;
obtaining, by the terminal device based on the first message, ephemeris information of a first satellite to use to communicate with the terminal device;
establishing, by the terminal device, a communication connection between the terminal device and the first satellite based on the obtained ephemeris information of the first satellite; and
communicating, by the terminal device, with the first satellite using the established communication connection.

10. The method according to claim 9, wherein obtaining, by the terminal device, the first message comprises:
obtaining, by the terminal device, the first message through an NG-C interface, an X-C interface, or an NG-X interface.

11. The method according to claim 9, wherein obtaining, by the terminal device based on the first message, the ephemeris information of the first satellite comprises:
selecting, by the terminal device based on the first message, the first satellite; and
obtaining, by the terminal device, the ephemeris information of the selected first satellite based on the selected first satellite.

12. The method according to claim 9, wherein the ephemeris request message is a random access message or uplink control information (UCI).

13. A communications apparatus, comprising:
a transceiver;
a processor; and
a non-transitory computer-readable storage medium storing a program to be executed by the processor, the program including instructions to:
obtain, through the transceiver, ephemeris information of a satellite in a satellite network, wherein the ephemeris information of the satellite in the satellite network comprises one or more of a beam parameter of the satellite in the satellite network, a physical resource of the satellite in the satellite network, or scheduling information of the satellite in the satellite network;
generate a first message based on the ephemeris information of the satellite in the satellite network, wherein the first message comprises ephemeris information of one or more satellites that serve a terminal device; and
cause the transceiver to send the first message in response to the terminal device performing random access to a cellular network.

14. The apparatus according to claim 13, wherein the instructions to obtain the ephemeris information include instructions to obtain the ephemeris information of the satellite in the satellite network through a first interface, wherein the first interface comprises an NG-S interface or an X-S interface.

15. The apparatus according to claim 13, wherein the instructions to cause the transceiver to send the first message include instructions to send the first message through a second interface in response to the terminal device performing random access to the cellular network, wherein the second interface comprises an NG-C interface, an X-C interface, or an NG-X interface.

16. The apparatus according to claim 13, wherein the instructions to obtain the ephemeris information include instructions to obtain an ephemeris request message of the terminal device, wherein the ephemeris request message requests the ephemeris information of the one or more satellites that serve the terminal device.

17. A terminal device, comprising:
a transceiver;
a processor; and
a non-transitory computer-readable storage medium storing a program to be executed by the processor, the program including instructions to:
send an ephemeris request message in response to the terminal device performing random access to a cellular network, wherein the ephemeris request message requests ephemeris information of one or more satellites that serve the terminal device, and wherein the ephemeris information comprises one or more of a beam parameter of the one or more satellites that serve the terminal device, a physical resource of the one or more satellites that serve the terminal device, or scheduling information of the one or more satellites that serve the terminal device;
obtain a first message, wherein the first message comprises the ephemeris information of the one or more satellites that serve the terminal device;
obtain, based on the first message, ephemeris information of a first satellite of the one or more satellites;
establish a communication connection between the terminal device and the first satellite based on the obtained ephemeris information of the first satellite; and
send data using the communication connection established between the terminal device and the first satellite of the one or more satellites.

18. The terminal device according to claim 17, wherein the instructions to establish the communication connection include instructions to obtain the first message through at least one of an NG-C interface.

19. The terminal device according to claim 17, wherein the instructions to obtain the ephemeris information include instructions to:
select, based on the first message, the first satellite; and
obtain the ephemeris information of the selected first satellite based on the selected first satellite.

20. The terminal device according to claim 17, wherein the instructions to establish the communication connection include instructions to obtain the first message through at least one of an X-C interface, or an NG-X interface.

* * * * *